June 3, 1941.  L. J. ZOLLER ET AL  2,244,322
APPARATUS FOR PREVENTING ELECTROLYTIC DESTRUCTION
Filed June 8, 1938
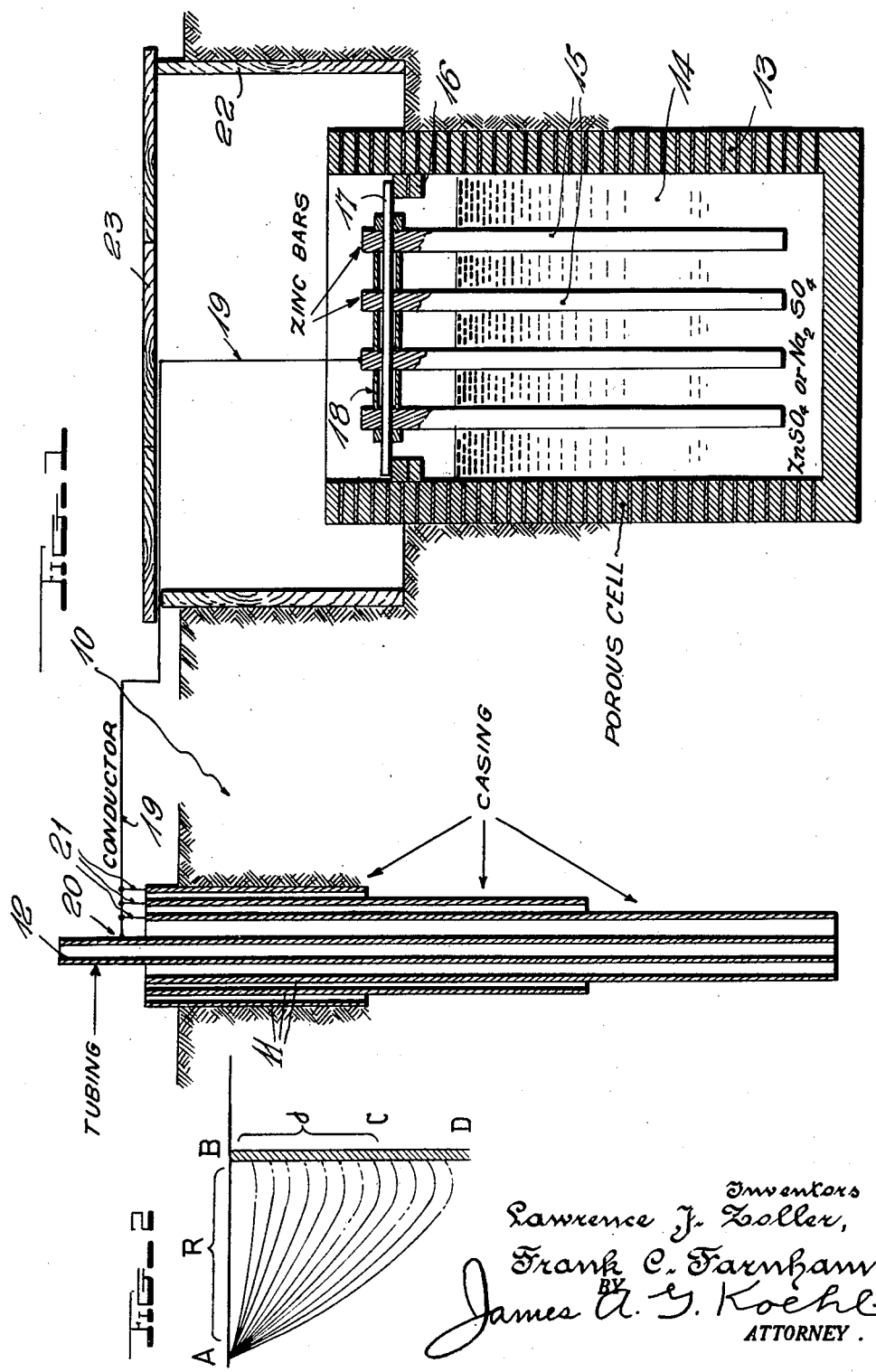
Inventors
Lawrence J. Zoller,
Frank C. Farnham,
BY James A. G. Koehl
ATTORNEY.

Patented June 3, 1941

2,244,322

UNITED STATES PATENT OFFICE 2,244,322

APPARATUS FOR PREVENTING ELECTROLYTIC DESTRUCTION

Lawrence J. Zoller, Tulsa, Okla., and Frank C. Farnham, Rolla, Mo., assignors to Central Commercial Company, a corporation of Illinois Application June 8, 1938, Serial No. 212,420

1 Claim. (Cl. 204—197)

This invention relates to an apparatus for preventing electrolytic destruction of buried metal, such as for example, the casing and tubing of oil wells or the like.

It is recognized that in any case where an electric current passes through a semi-infinite medium entering through one electrode and leaving through another, the difference in potential between any two points in the medium may be computed by considering the effect of each electrode separately, then adding the two potential differences. If one of the electrodes is a point electrode the difference in potential at two points on the linear electrode will be governed by the relative distance of the two points from the point electrode.

The difference in potential between two points at distance $R_1$ and $R_2$ from a point electrode in the surface of the ground by which a current of I amperes enters the ground is given by the equation $$V = \frac{\rho I}{2\pi}\left(\frac{1}{R_1} + \frac{1}{R_2}\right)$$

where $\rho$ is the resistivity of the earth in meter-ohms when $R_1$ and $R_2$ are in meters. If a point at infinite distance from the electrode is considered to be at zero potential a point at R meters from the electrode is said to be at a potential $$V = \frac{\rho I}{2\pi R}$$

Upon referring to Figure 2 of the accompanying drawing, point A is the location of a point electrode by which I amperes of current enters the ground. B, C, D is a linear conductor such as a well casing at distance R from A. The drop in potential from B to C due to the current entering the ground at A is written $$V_{BC} = K\frac{\rho I}{2\pi R}$$

where K is the ratio of the difference in potential between B and C to the difference in potential between B and a point at infinite distance. Table I gives the values for K corresponding to a few values of the ratio of BC to R.

Table I

| BC/R | K |
|---|---|
| 0.5 | .123 |
| 1.0 | .29 |
| 1.41 | .42 |
| 2.0 | .55 |
| 3.0 | .68 |
| 5.0 | .80 |
| 10.0 | .90 |

If now we consider that the effective radius of the point electrode is one meter and that the potential difference between the electrode and a point at infinite distance from it is of the order of one volt, which can be considered to be the potential of the surface of the electrode, Table II gives the values of the potential at a number of points at different distances from the center of the electrode.

Table II

| R | V |
|---|---|
| 2 | .500 |
| 5 | .200 |
| 10 | .100 |
| 20 | .050 |
| 50 | .020 |
| 100 | .010 |
| 1000 | .001 |

Since the difference in potential between iron and zinc immersed in an electrolyte is of the order of .75 volt a study of the aforementioned tables will show that if a well were 1,000 meters deep and its casing were connected electrically to a zinc electrode of effective radius of one meter placed at 1,000 meters from the well the difference in potential between the top of the casing and the bottom thereof would be a maximum of .29 millivolt. Whereas if the installation were made at 100 meters from the well the drop in potential from top to bottom of the casing would be nearly 10 millivolts. Since it is desirable to have the casing at as nearly uniform potential as possible it would follow that the protecting electrode should be installed at a distance from the top of the well equal to at least half of the depth of the well.

It is to be understood, of course, that the aforestated procedure may be modified to meet local conditions. If the zone of corrosion is known to be at a certain depth it is calculated that approximately half the depth to the zone of corrosion might be used as the distance to remove the installation from the top of the well.

It shall be borne in mind also that the current leaving the ground by way of the casing and tubing gives rise to a difference in potential between the ground and the tubing. It is this difference in potential which must be taken advantage of for the protection of the casing from spontaneous currents arising thereon. In broad aspect a generalized qualitive discussion of the results obtained from the practice of the invention is as follows:

Current will flow through the ground from the zinc to the iron of the casing and tubing. The current entering the ground by way of the zinc immersed in zinc sulfate will give rise to a drop in potential between points in the ground at varying distances from the electrode as given by Equation one, above. The effective radius of the zinc electrode is the boundary between the electrolyte in which it is immersed and the ground water. If the zinc electrode is installed too close to the wall casing a large proportion of the available current will enter the casing within a short distance of the surface leaving very little current to enter the casing at greater depths, thus leaving the deeper buried portions of the casing and tubing unprotected. By removing the zinc electrode to about half of the depth of the well from the top of the well it is shown that the available difference in potential is more evenly distributed over the length of the casing. The current that enters the casing from the ground leaves a deposit of molecular hydrogen on the iron, providing a film which immediately tremendously increases the resistance between the ground and said casing. With this film of molecular hydrogen over the surface of the casing nearly the entire difference in potential between the zinc and the iron is concentrated within a very short distance of the surface of the casing and effectively blocks any spontaneous action between the iron and the ground water.

We have knowledge of prior art devices which aim to prevent electrolytic destruction of buried iron by induced flow of current to the iron from an anode placed directly in the ground. These devices have been found wholly inoperative for the purpose intended, due largely, if not entirely, to certain causes, namely, (1) that the currents derived from zinc anodes placed directly in the ground are too small on account of the large contact resistance between same and the ground water, (2) that by reason of direct embedment of zinc in the ground, the efficiency of the zinc is constantly diminished as no opportunity is afforded the impurities to slough off as the zinc is consumed, and (3) that a materially restricted zone of protection is offered the buried iron due to the fact that, as the potential varies inversely as the distance from the zinc, excessive current is compelled to flow in the immediate neighborhood of the zinc and practically none at the more remote points.

From the aforestated more or less brief discussion of the prior art devices and their limitations as compared with the new and patenably novel features of our invention, certain of the more essential objects of the invention are stated as follows:

(1) The feature which resides in our discovery that to the end that the invention shall always be fully operative for the purpose intended, it must be disposed and properly mounted a correct working distance from the ferrous metal desired to be preserved.

(2) The feature which insures a constant deposit of molecular hydrogen on the ferrous object functioning to increase the resistance between the ground and the object and continuous conduction of useful voltage throughout all surfaces of the object.

(3) The feature which includes the use of zinc in a concentrated electrolyte to thereby reduce the resistance from metal to electrolyte.

(4) The feature which enables the mounting of the zinc in an electrolyte in a manner enabling the impurities contained in commercial zinc to slough off where they will have no harmful effects in the form of local action.

(5) The feature broadly enabling satisfactory use of a cheap grade of commercial zinc.

(6) The feature which insures self-regulatory functioning and practical and economical operation of the invention at all times.

(7) The feature enabling convenient application of the invention to a well without requiring changes to be made in any part thereof, and without the necessity of pulling the casing.

(8) The feature which affords convenient access to be had to the electrolyte and the zinc as occasion therefor shall arise.

It is to be clearly understood that the description and the drawing are for the purpose of illustration only, and can be departed from as to modifications reasonably falling within the scope and intention of the invention and the scope of the hereto appended claims.

In the accompanying drawing:

Figure 1 is a more or less schematic view in vertical section with parts in full lines showing one practical embodiment of the invention, and Figure 2 is a diagram showing a precalculated or predetermined relationship of the half-cell and the object intended to be protected against electrolytic destruction.

In the embodiment of the invention shown in Figure 1 of the accompanying drawing, 10 indicates the ground, 11 the strings of the well casing, and 12 the well tubing. At a distance from the well calculated or predetermined substantially in the manner aforestated, there is a porous receptacle 13 embedded in the ground and charged with an electrolyte 14 in which are vertically suspended electrodes 15 of material electro-negative to the iron of the casing and tubing and constituting an electric half-cell.

The receptacle 13 can be economically built of common clay brick laid up with a shove joint in acid resisting mortar. The electrolyte may be of any suitable well known kind such as zinc sulphate, sodium sulphate, and the electrodes are preferably commercial zinc. The receptacle 13 is provided with a ledge 16 which receives the ends of supporting bars or electrical conductors 17 on which the upper ends of the electrodes are strung and axially spaced apart from each other by coaxial spacers 18, the method of mounting the electrodes serving to hold the electrodes properly submerged in the electrolyte while enabling convenient withdrawal thereof from the receptacle for replacement purposes as and when necessary. One or more of the electrodes has a good metallic connection 19 with the tubing at 20 and the several strings of the casing at 21.

The pit for the half-cell is enlarged at the upper portion and fitted with a crib 22, having a cover 23, providing ready access to the interior of said half-cell for charging, and inspection.

With the half-cell electrically connected with the well tubing and casing as herein shown and described, the operation of the invention is as follows:

Since the difference in potential between iron and zinc immersed in an electrolyte is of the order of .75 volt, it is assumed, for sake of clear illustration that the well shown in Figure 1 is 1,000 meters deep and that the effective radius of the electrodes 15 is one meter placed 1,000 meters from the well. Thus, the difference in potential between the top of the casing and the bottom thereof is a maximum of .29 millivolt. It follows upon referring to the aforestated tables of relative ratios that if the installation instead of being spaced 1,000 meters from the well is spaced 100 meters therefrom, the drop in potential from the top to the bottom of the well casing will be about 10 millivolts.

Now, since it is desirable to have the casing at as nearly uniform potential as possible, it is noted that according to our discovery, any installation should be situated a distance from the top of the well equal to at least half of the depth of the well.

While we have made more or less specific reference to approximately exact distances between wells to be protected and their associated protective installations in order that and in compliance with the statutes one can clearly comprehend from the disclosure sufficient to enable the invention to be carried into practice, we, of course, do not propose to be limited in this respect. Obviously, the procedure herein suggested to be followed can and many times will be modified or departed from to meet local conditions.

To the best of our knowledge, we are the first in the art to discover and provide ways and means whereby the difference in potential between ground and the well casing can be taken advantage of for the full protection of the casing from the effects of spontaneous currents arising thereon. As previously stated, the current that enters the casing from the ground leaves a deposit of molecular hydrogen on the iron which immediately tremendously increases the resistance between the ground and the casing. With this film of molecular hydrogen continuously maintained as a coating or film on the surface of the casing, nearly the entire difference in potential between zinc and the iron is concentrated within a very short distance of the surface of the casing and therefor effectively blocks any spontaneous action between the iron and the ground water.

If the zinc electrode is installed too close to the well casing a large proportion of the produced current will enter the casing within a short distance of the earth's surface such that the casing at lower depths is entirely unprotected as no current enters same.

We are further of the opinion and therefore claim broadly that it is novel to provide an electric half-cell buried in the ground a proper, predetermined or precalculated distance from the metal to be protected, the same having one or more electrodes always immersed in an electrolyte. Said electrodes are of metal that is electro-negative to the metal to be protected. By electro-negative is meant a material that is electro-negative to iron according to the sign of potentials as adopted by the United States Bureau of Standards for the electromotive series. In practice, we suggest the use of commercial zinc and by holding the electrodes always immersed in the electrolyte, the lead impurities contained therein can slough off as the zinc is consumed and fall to the bottom of the receptacle 13, thereby insuring continuous production of large current capable of functioning as herein intended and clearly pointed out. By freely allowing the lead impurities to slough off, the device is made active at all times and the precalculated efficiency of the device is never interfered with, a feature which we find is necessary as distinguished from attempts to use commercial zinc buried in the earth and in contact therewith.

Adjectives used herein either in the claims or in the text and as relative terms such as the words "proper," "predetermined" and "precalculated" shall be construed in the sense that distinguishes a correct working relationship of well to installations from a mere arbitary and possibly an ineffective or inoperative spacing. They also can properly be construed to mean a distance definitely determined after such factors as the overall length of the metal to be protected is ascertained.

Regarding schemes heretofore proposed to protect oil wells and the like against electrolytic decomposition by connecting them with zinc rods stuck in the ground an arbitrary distance from the well, or zinc rings fitted onto parts of the well casing or tubing, there have been inherent defects in these schemes that have prevented them from coming into practical use, so far as we are aware. It is apparent upon careful analysis, that where a zinc rod, close to the well is used for an electrode, there will be an excessive flow of current to those portions of well casing and tubing adjacent to the zinc electrode, and very little, if any current towards the well parts remote from said electrode. Since ground water acts as an electrolyte in such an installation and is very dilute, the ground contact resistance between zinc and the ground is very high, thereby limiting the current to a very small value. Where zinc sleeves on the iron or steel tubing are used, there is excessive current in the immediate vicinity of the sleeve and negligible current at remote points.

In an installation made according to this invention, the resistance between the zinc and the electrolyte is very low as compared with the installations of the past. Commercial zinc can be used because the impurities will slough off and drop to the bottom of the receptacle 13, whereas in the prior apparatus referred to, impurities in the zinc could not be removed, and since the principal impurity is lead, which is electro-positive to iron, back-electromotive forces were set up which soon stopped the flow of current.

By using a large porous receptacle 13 containing an electrolyte for the real connection between the electro-negative metal and the ground, that part of the installation can be so located, with respect to the well casing and tubing that relatively large currents are provided and flow to and through all parts thereof.

This application is a continuation in part of our application for Preventing electrolytic destruction, filed Nov. 2, 1935, Serial No. 47,926.

What we claim as our invention is:

An apparatus for preventing electrolytic destruction of metallic tubing in situ in wells comprising an electric half-cell, said half-cell comprising a receptacle containing a liquid electrolyte and having porous walls, said receptacle adapted to be buried in the ground and laterally spaced apart from the tubing, and means for suspending in said electrolyte at least one electrode that is electro-negative to the tubing, means enabling the electrode to be electrically connected to said tubing, whereby when the half-cell is buried as aforestated and connection is made, a current of electricity will flow from the half-cell through the ground to said tubing for preventing electrolytic destruction of said tubing.

LAWRENCE J. ZOLLER.
F. C. FARNHAM.